United States Patent [19]

Schuster

[11] 4,303,540
[45] * Dec. 1, 1981

[54] COOLING, LUBRICATING AND CLEANING AGENT

[76] Inventor: Dietrich Schuster, Am Kaefernberg 7, 6741 Frankweilier, Pfalz, Fed. Rep. of Germany

[ * ] Notice: The portion of the term of this patent subsequent to Oct. 7, 1997, has been disclaimed.

[21] Appl. No.: 149,727

[22] Filed: May 14, 1980

Related U.S. Application Data

[63] Continuation-in-part of Ser. No. 913,848, Jun. 8, 1978, Pat. No. 4,226,734.

[30] Foreign Application Priority Data

Dec. 22, 1977 [DE] Fed. Rep. of Germany ....... 2757322

[51] Int. Cl.³ .............................................. C10M 1/06
[52] U.S. Cl. .................................. 252/49.3; 252/49.5; 252/49.6; 260/404; 260/462 R; 424/185
[58] Field of Search .................... 252/49.3, 49.5, 49.6; 260/404, 462 R

[56] References Cited

U.S. PATENT DOCUMENTS

| | | | |
|---|---|---|---|
| 2,052,192 | 8/1936 | Piggott | 260/462 R |
| 2,216,618 | 10/1940 | Katz | 260/462 R |
| 2,408,332 | 9/1946 | Morgan | 260/462 R |
| 2,441,063 | 5/1948 | Gilmann | 260/404 X |
| 3,429,909 | 2/1969 | Schuster | 260/462 R |
| 3,544,614 | 12/1970 | Schwartz | 260/462 R |
| 3,719,598 | 3/1973 | King | 252/49.3 X |
| 3,764,593 | 10/1973 | Schuster | 260/462 R |
| 3,969,236 | 7/1976 | Waldstein | 252/495 |
| 4,022,713 | 5/1977 | Waldstein | 252/495 |
| 4,226,734 | 10/1980 | Schuster | 252/49.3 |

FOREIGN PATENT DOCUMENTS 1620447 3/1976 Fed. Rep. of Germany ...... 260/404

*Primary Examiner*—Helen M. S. Sneed
*Attorney, Agent, or Firm*—Staas & Halsey

[57] ABSTRACT

A cooling, lubricating and cleaning agent, for use by the metalworking industry, produced by the condensation reaction between an excess amino alcohol with boric acid and the addition of a carboxylic acid to the complex boron containing diamine formed in the reaction system.

8 Claims, No Drawings

COOLING, LUBRICATING AND CLEANING AGENT

CROSS REFERENCES TO RELATED APPLICATIONS

This application is a continuation-in-part of my copending U.S. application Ser. No. 913,848 filed June 8, 1978 and issued as U.S. Pat. No. 4,226,734 on Oct. 7, 1980.

BACKGROUND OF THE INVENTION

The metal-working industry, in order to accomplish shaping processes on metals, no matter whether they are made by cutting or non-cutting, needs coolants which facilitate the shaping processes and which, in particular, are in a position to eliminate the heat energy occurring, and to simultaneously and subsequently protect the shaped metal from corrosion.

As is well known, such agents are generally called cooling-cutting compounds or cooling lubricants. The development of these cooling - cutting compounds was particularly rapid during the past decade, because of the general tendency toward automation of the finishing processes. This rapid development led to products which in their essence and composition may be defined as colloid-dispersed systems of non-saponifiable mineral oils in mixture with surface-active substances in water.

As a result of automating the production within the metal-working plants, it has become necessary to depart from the formerly customary use of pure mineral oil emulsions, which had been prouced from petroleum sulfonates and mineral oils, since these mineral oil emulsions no longer satisfied the rising demands. On the one hand, these mineral oil emulsions, because of their high content of mineral oil, had only a poor or unsatisfactory cooling effect. On the other hand, these mineral oil emulsions, because of their low capacity for dilution with water, also had only a poor or unsatisfactory corrosion protection property. A third disadvantage of these mineral oil emulsions was their low resistance against micro-organisms. This resulted in the undesirable formation of decaying substances, odorous annoyances and a high strain on the environment.

The development of better cooling - cutting agents, which contained less mineral oil and resulted in less of a strain on the environment, led to the use for the first time of complex soaps of ethanol amines with natural fatty acids. These agents were obtained by special processes under the influence of boric acid at temperatures between 230° and 200° C. These new cooling-cutting agents were used with great success in the metal-working industry. For example, in metal processing or metal forming plants, in which the former coolants could be kept only a few weeks with the addition of preservatives, operating lifetimes of 30 weeks and more were achieved with the above described novel products, without there being any need of adding preservatives. This advantage along provides a tremendous decrease in the costs, and enables a manifold increase in the effects of automation. Furthermore, the skin allergies of the workers, caused by the preservatives used, disappeared completely when the above described novel products were substituted.

It was further observed that using the above mentioned novel cooling-cutting agents (representing colloidal-disperse systems) allowed one to carry out cutting operations on highly alloyed steels for airplane turbines; up to that time these operations had not been achieved and were not even considered possible.

Therefore, these new, above described cooling - cutting agents have been found very satisfactory for numerous applications.

However, in considering particular technical applications it became apparent that certain disadvantages still existed for certain areas of usage which could not be eliminated by the use of the above described prior art cooling-cutting agents.

The reason for the problems with the prior art agents is that all known fatty acids form line soaps which lead to deposits. These deposits in turn, together with the mineral oil coming from the machines, lead to residues. These residues are not removable or are removable only with great difficulty because of their insolubility in water.

These problems at first seemed insignificant but lately they have acquired extraordinary importance in practice. The problems are especially significant in the case of machines and finishing processes that are controlled numerically. Their manufacturing output may be interrupted or even stopped by the adherence of a small metal splinter to the slideways.

Furthermore, the precipitated lime soaps, which may be deposited in the supply line systems, form a nutrient medium for microorganisms. These microorganisms consume the organic components of the lime soaps and leave insoluble calcium oxide or insoluble calcium carbonates behind. These lime deposits, which then solidify in the pipe line systems, lead to the pipe lines becoming radially shut from the outside of the pipe lines towards the inside and eventually plugging up the pipe lines completely.

SUMMARY OF THE INVENTION

The object of the present invention is to create cooling, lubricating and cleaning agents for the metalworking industry as well as to create a process for their production. The agents are particularly suitable for numerically controlled metal-working machines. The adherence of even small chips of metal is prevented and the precipitation of lime soaps is also prevented, thus eliminating the possibility of plugged up supply lines in the system.

It was found that the technical task described above is solved according to the present invention by creating new cooling, lubricating and cleaning agents by means of a particular condensation reaction. These new cooling, lubricating and cleaning agents have the above described positive characteristics.

The condensation reaction is produced between an excess amino alcohol with boric acid and the addition of a carboxylic acid to the complex, boron containing diamine formed in the reaction system. The carboxylic acid consists of an oxaethane carboxylic acid, for example, lauryl-poly-1-oxapropinic acid. Concerning one connecting class of the oxaethane carboxylic acids used, reference is made to the standard work by Dr. J. G. Aalbers, 1966, Publishers WED. G. Van Soest N. V. Amsterdam (especially to pp. 26 to 31).

Generally stated, the oxaethane carboxylic acids are obtained by ethoxylization of fatty alcohols and subsequent conversion with chloracetic acid sodium.

Concerning the use of the new cooling, lubricating and cleaning agents of the invention and particularly the details of the use, we cite German Pat. No. 16 20

447, the owner of which being the applicant of the present application.

Surprisingly, it was further found that even the combination of the hitherto customary fatty acids (for example, lauric acid or myristic acid with an oxaethane carboxylic acid) will lead to cooling, lubricating and cleaning agents for the metalworking industry capable of solving the above-mentioned technical problems.

DESCRIPTION OF THE PREFERRED EMBODIMENTS

The essence of the present invention will now be explained further in the following paragraphs on the basis of embodiments, whereby the surprisingly positive effects are also contained in the embodiments.

The cooling, lubricating and cleaning agent of the present invention is formed by the condensation reaction of an excess amino alcohol with boric acid and the adding of an oxaethane carboxylic acid to the boron containing, complex diamine formed in the reaction system. Two groups of oxaethane carboxylic acid which may be used are fatty alcohol polyglycol ether carboxylic acids and alkyl phenol polyglycol ether carboxylic acids. Some examples of oxaethane carboxylic acids which may be used include: lauryl polyglycol ether carboxylic acid, oleyl polyglycol ether carboxylic acid, stearyl polyglycol ether carboxylic acid, cetyl polyglycol ether carboxylic acid and octyl polyglycol ether carboxylic acid. Thus, not only the lauryl derivative of oxaethane carboxylic acid, but also any other oxaethane carboxylic acid analagous to the lauryl-type configuration may be employed.

It is preferred that the carbon chain of these arbitrary oxaethane carboxylic acids be between C7 and C21, whereby straight, branched and cyclic carbon chains can be used both with 1 and 6 unsaturated bonds. In the preferred embodiment the oxaethane carboxylic acid consists of lauryl-poly-1-oxapropinic acid.

The first group of oxaethane carboxylic acid which may be used (fatty alcohol polyglycol ether carboxylic acid) has the general formula: $R-(OCH_2CH_2)_xOCH_2COOH$, where R can be: any alkyl group with a chain length which is longer than $C_5H_{11}$—and shorter than $C_{24}H_{29}$—and where X can be: any number from 1 to 20.

The second group of oxaethane carboxylic acid which may be used (alkyl phenol polyglycol ether carboxylic acid) has the formula: $R-phenol-(OCH_2CH_2)_xOCH_2COOH$, where R can be: any alkyl group with a chain length which is longer than $C_5H_{11}$—and shorter than $C_{24}H_{49}$—and where X can be: any number from 1 to 20.

The table below gives information about the most important properties of the polyglycol ether carboxylic acids used in examples 1 to 12.

In producing the cooling, lubricating, and cleaning agent the following molar ranges are preferred:

1-4 moles boric acid:
6-9 moles amino alcohol:
1-3 moles oxaethane carboxylic acid It is to be understood that the above represent only preferred ratios and that the present invention may be practiced using ratios other than those set forth above.

In Examples 1-4 below the oxaethane carboxylic acids are lauryl polyglycol ether carboxylic acids.

EXAMPLE 1

Condensation reaction with diethanolamine, boric acid and lauryl (poly-1-oxapropane) oxaethane carboxylic acid.

The products are in the following mutual molar and gram ratio:

7 moles diethanolamine (435 g)
3.3 moles boric acid (=orthoboric acid) (203.9 g)
1 mole lauryl (poly-1-oxapropene) oxaethane carboxylic acid (368 g)

The quantity of water condensed out amounts to 8.3 moles.

The condensation product is bright yellow and viscous, is dissolved clearly in water and has a pH value of 9.0.

A basic emulsion is produced with spindle oil, by mixing the above-noted product with water in a ratio of 2:1, and then adding 2 to 3 parts of spindle oil. This clear basic emulsion becomes transparent to milky white in color when dissolved in water. Such a product has an excellent corrosion-impeding effect and fulfills the conditions of the Herbert test (see German Pat. No. 16 20 447) even in a dilution of 1:100.

EXAMPLE 2

Condensation reaction with diethanolamine, boric acid, lauryl (poly-1-oxapropene) oxaethane carboxylic acid and a vegetable mixed oil fatty acid.

The products are in the following mutual molar and gram ratio:

8 moles diethanolamine (840 g)
1 mole boric acid (=orthoboric acid) (61.8 g)
3 moles lauryl (poly-1-oxapropane) oxaethane carboxylic acid (1104 g)
1 mole vegetable mixed oil fatty acid (~300 g)

The quantity of water condensed out amounts to 11.1 moles.

The condensation product is a brownish gold clear liquid, is dissolved clearly in water and has a pH value of 9.0.

Whenever equal parts of the above-noted product are mixed with spindle oil, a viscous clear solution will result, which turns a milky white to transparent color when dissolved in water. The product has an excellent corrosion-impeding effect and fulfills the conditions of

TABLE 1

| oxaethane carboxylic acids | | pH of 1% solution | surface tension | appearance at 20° C. | solubility in petroleum ether ethanol | dispersibility in petroleum ether ethanol |
|---|---|---|---|---|---|---|
| R = | X = | | | | | |
| 1. lauryl | 2.5 | 3-4 | 33 | liquid | 1 | — |
| 2. oleyl | 2 | 3-4 | 33 | liquid | 1 | — |
| 3. stearyl | 6 | 3-4 | 45 | solid | — | d |
| 4. cetyl | 8 | 3-4 | 40 | solid | 1 | — |
| 5. octyl | 8 | 3-4 | 33 | liquid | — | d | the Herbert test even in a dilution of 1:100.

EXAMPLE 3

Condensation reaction with monoethanolamine, boric acid and lauryl (poly-1-oxapropene) oxaethane carboxylic acid.

The products are in the following molar and gram relationship to one another:

7 moles monoethanolamine (427 g)
3.3 moles boric acid (=orthoboric acid) (203.9 g)
1 mole lauryl (poly-1-oxapropene) oxaethane carboxylic acid (368 g)

The condensation product is yellow and solidifies after cooling off. It forms a white emulsion having a pH of 9.0 when dissolved in water.

A mixture of one part water with one part spindle oil results in a white emulsion. The product has an excellent corrosion-impeding effect and fulfills the conditions of the Herbert test even in a dilution of 1:100.

EXAMPLE 4

Condensation reaction of diethanolamine, boric acid lauryl (poly-1-oxapropene) oxaethane carboxylic acid and mixed oil fatty acid.

The products are in the following molar and gram relationship to one another:

9 moles diethanolamine (945 g)
3 moles boric acid (=orthoboric acid) (185.4 g)
1 mole lauryl (poly-1-oxapropene) oxaethane carboxylic acid (368 g)
3 moles mixed oil fatty acid (900 g)

The quantity of water condensed out amounts to 5 moles.

The condensation product is brown and relatively viscous. It turns milky in color and has a pH value of 9.0 when dissolved in water.

A mixture including equal parts of spindle oil and water, results in a thick, fat-like, white emulsion, which remains white when dissoved in water. One will obtain a better solubility of the basic emulsion, when an additional 4% of free lauryl (poly-1-oxapropene) oxaethane carboxylic acid is added to 100 parts of the original emulsion. The product has an excellent corrosion-impeding effect and fulfills the conditions of the Herbert test even in a dilution of 1:100.

EXAMPLE 5

The products are in the following molar and gram relationship to one another:

7 moles diethanolamine (735 g)
3 moles boric acid (185 g)
1 mole oleyl polyglycol ether carboxylic acid (No. 2 of Table 1) (606 g)

The amount of condensed-out water was 8 moles or 144 g. The condensation product has a golden brown color and is highly viscous. The condensation product dissolves in water in a ratio of 2:1 and is capable of emulsifying mineral oil, during which transparent to milky solutions are formed, depending on the amount of mineral oil. The emulsifying effect can be increased by adding 5 parts of oleyl polyglycol ether carboxylic acid to a mixture consisting of:

20 parts of the condensation product
10 parts of water
30 parts of spindle oil

In this case, 35 additional parts of mineral oil can be emulsified. The solution of this mixture in water is transparent, has a pH value of 9.0 and meets the conditions of the Herbert test, even when diluted in a ratio of 1:100.

EXAMPLE 6

The products are in the following molar and gram relationship to one another:

8 moles diethanolamine (840 g)
2 moles boric acid (122 g)
1 mole oleyl polyglycol ether carboxylic acid (No. 2 of Table 1) (606 g)
4 moles oleic acid (1,130 g)

The products were heated for 1½ hours at 200° C. In the process, 10 moles of water or 180 g were condensed out. The condensation product has a dark brown color and in a ratio of 2:1 with water it is insoluble, but dispersible.

If twice the amount in spindle oil is added to this dispersion, a limpid solution is obtained which readily emulsifies in water. This solution is an excellent anticorrosive agent and meets the Herbert test when diluted in a ratio of 1:100.

EXAMPLE 7

The products are in the following molar and gram relationship to one another:

6 moles diethanolamine (630 g)
3 moles boric acid (183 g)
1 mole stearyl polyglycol ether carboxylic acid (No. 3 of Table 1) (578 g)

The products were heated for one hour at 200° C. and in the process 10 moles of water or 180 g were condensed out. The condensation product has a golden yellow color and is highly viscous. It can be dissolved in water in a ratio of 2:1, a gelatinous viscous solution being produced, which has a slightly alkaline reaction and a pH of 8.5.

Further dilution of this solution with water renders it limpid. Such a solution meets the conditions of the Herbert test even when diluted in a ratio of 1:120.

EXAMPLE 8

The products are in the following molar and gram relationship to one another:

6 moles diethanolamine (630 g)
3 moles boric acid (183 g)
1 mole stearyl polyglycol ether carboxylic acid (No. 3 of Table 1) (578 g)
2 moles stearic acid (568 g)

The products were heated for one hour at 200° C., during which 12 moles of water or 216 g were condensed out. The condensation product has a dark golden brown color, is solid at room temperature, and has a viscous fatty consistency. It is only slightly dispersible in water, but it can be worked into mineral oil with little water, making such mixtures excellent for protection against corrosion.

EXAMPLE 9

The products are in the following molar and gram relationship to one another:

7 moles diethanolamine (735 g)
4 moles boric acid (264 g)
1 mole cetyl polyglycol ether carboxylic acid (No. 4 of Table 1) (652 g)

The products were heated for one hour at 200° C., during which 9 moles of water or 162 g were condensed out. When mixed with water in a ratio of 2:1, the condensation product has a bright golden yellow color and is transparent in water. Such an aqueous solution has a pH value of 9 and is capable of emulsifying an equal amount of spindle oil to form a limpid solution. The water solutions of such emulsions are excellent anticorrosive agents and are particularly suited as cooling and cutting fluids in the metal industry.

EXAMPLE 10

The products are in the following molar and gram relationship to one another:
9 moles diethanolamine (945 g)
2 moles boric acid (122 g)
1 mole cetyl (No. 4 of Table 1) (625 g)
1 mole mixed oil fatty acid (300 g)

The products were heated for an hour at 200° C., during which 8 moles of water or 144 g were condensed out. The condensation product has a golden brown color and is transparent in water when mixed in a ratio of 2:1. Such a solution has excellent lubricating and anticorrosive properties. Such water solutions can be utilized as hydraulic fluids or as metal-working fluids.

EXAMPLE 11

The products are in the following molar and gram relationship to one another:
9 moles diethanolamine (945 g)
2 moles boric acid (122 g)
1 mole octyl (No. 5 of Table 1) (652 g)

The products were heated for an hour at 200° C. curing which 8 moles of water or 144 g were condensed out. The condensation product has a bright yellow color and dissolves in water in a ratio of 2:1 with a pH of 9.5. The solution can be used to clean and degrease metals and is an excellent anticorrosive agent.

EXAMPLE 12

The products are in the following molar and gram relationship to one another:
9 moles diethanolamine (945 g)
2 moles boric acid (122 g)
1 mole octyl (No. 5 of Table 1) (652 g)
1 mole oleic acid (182 g)

The products were heated for an hour at 200° C., during which 10 moles of water were condensed out. The product has a brownish yellow color, is quite capable of flowing, dissolves in water in a ratio of 2:1 and has a pH of 9. Twice the amount in spindle oil can be worked into this solution, thereby producing very stable emulsions, which are excellent anticorrosive agents and are suitable as aqueous cooling, lubricating and cutting fluids.

In the above examples we refer to the oxaethane carboxylic acids as fatty alcohol polyglycol ether carboxylic acids in order to describe their development from fatty alcohols through ethoxylation and subsequent carboxymethylization.

For convenience, in the examples, we have dealt only with several oxaethane carboxylic acids. Of course, other oxaethane carboxylic acids may be used in practicing the present invention.

The foregoing is considered as illustrative only of the principles of the invention. Further, since numerous modifications and changes will readily occur to those skilled in the art, it is not desired to limit the invention to the exact examples shown and described. Accordingly all suitable modifications and equivalents falling within the scope of the invention may be resorted to.

I claim:

1. A cooling, lubricating, and cleaning agent, comprising the agent formed by the condensation reaction of an excess aminoalcohol with boric acid, and the adding of an oxaethane carboxylic acid to the boron containing complex diamine formed in the reaction system.

2. A cooling, lubricating and cleaning agent, comprising the agent formed by the condensation reaction of an excess aminoalcohol with boric acid, and the adding of an oxaethane carboxylic acid and a fatty acid to the boron containing complex diamine formed in the reaction system.

3. A cooling, lubricating and cleaning agent as set forth in claim 1, wherein said agent is formed by the condensation reaction of an excess diethanolamine with boric acid, and the adding of lauryl (poly-1-oxapropene) oxaethane carboxylic acid.

4. A cooling, lubricating and cleaning agent as set forth in claim 2, wherein said agent is formed by the condensation reaction of excess diethanolamine with boric acid, and the adding of lauryl (poly-1-oxapropene) oxaethane carboxylic acid and a fatty acid.

5. A cooling, lubricating and cleaning agent as set forth in claim 1, wherein said agent is formed by the condensation reaction of excess monoethanolamine with boric acid, and the adding of lauryl (poly-1-oxapropene) oxaethane carboxylic acid.

6. A cooling, lubricating and cleaning agent as set forth in claim 2, wherein said agent is formed by the condensation reaction of excess monoethanolamine with boric acid, and the adding of lauryl (poly-1-oxapropene) oxaethane carboxylic acid and a fatty acid.

7. A process for the production of a cooling, lubricating and cleaning agent, comprising the steps of condensing an excess amino alcohol with boric acid, and then adding an oxaethane carboxylic acid to the complex boron containing diamine formed in the reaction system.

8. A process for the production of a cooling, lubricating and cleaning agent as set forth in claim 7, wherein an amino alcohol is condensed with boric acid and both an oxaethane carboxylic acid and a fatty acid are added to the complex boron containing diamine formed in the reaction system.

* * * * *